United States Patent [19]

Hysler

[11] 4,096,424
[45] Jun. 20, 1978

[54] ELECTRICAL CIRCUIT FOR CONTROLLING THE FEED RATE OF PARTS

[75] Inventor: George J. Hysler, St. Clair Shores, Mich.

[73] Assignee: N.D.T. Laboratories, Inc., Warren, Mich.

[21] Appl. No.: 704,165

[22] Filed: Jul. 12, 1976

[51] Int. Cl.² ............................................ G01D 5/34
[52] U.S. Cl. .................................. 318/480; 318/39; 250/223 R
[58] Field of Search ............... 318/39, 480, 313, 139, 318/341; 250/233 R, 223 R

[56] References Cited

U.S. PATENT DOCUMENTS

| | | | |
|---|---|---|---|
| 2,966,253 | 12/1960 | Gerrans | 318/480 X |
| 3,200,932 | 8/1965 | Metz et al. | 198/572 |
| 3,546,555 | 12/1970 | Morgan et al. | 318/341 |
| 3,780,297 | 12/1973 | Geary | 250/223 R |
| 3,845,375 | 10/1974 | Stiebel | 318/480 X |
| 3,919,612 | 11/1975 | Ratzel et al. | 318/472 X |
| 3,921,047 | 11/1975 | Carter | 318/480 X |

*Primary Examiner*—B. Dobeck
*Attorney, Agent, or Firm*—Harness, Dickey & Pierce

[57] ABSTRACT

Disclosed is a circuit for automatically controlling the feed rate of parts that is particularly adapted for controlling inductive loads. Disposed on either side of a passageway is a light source and a photo-sensing device which emits a signal pulse whenever a part interrupts the light beam between the light source and the photo-sensor. The pulses from the photo-sensing device are supplied to a monostable multivibrator which converts the pulses to uniform width, fixed amplitude pulses that are integrated and provided to a control circuit which controls the charge on a capacitor. When the charge on the capacitor exceeds a predetermined level an SCR is triggered, operating the motive means of the circuit.

In addition to a first discharge path for controlling the charge on the capacitor in accordance with the frequency of the signal pulses from the photo-sensing device, the control circuit provides an additional discharge path for resetting the charge level on the capacitor to its quiescent state after each cycle of the power supply signal. In this manner, the motor can be operated at low speed control settings without causing erratic operation due to "skip-cycling".

Also disclosed is circuitry which permits the system to be used to control inductive motors such as vibratory feeders without causing overheating of the motors after a continuous period of use.

15 Claims, 6 Drawing Figures

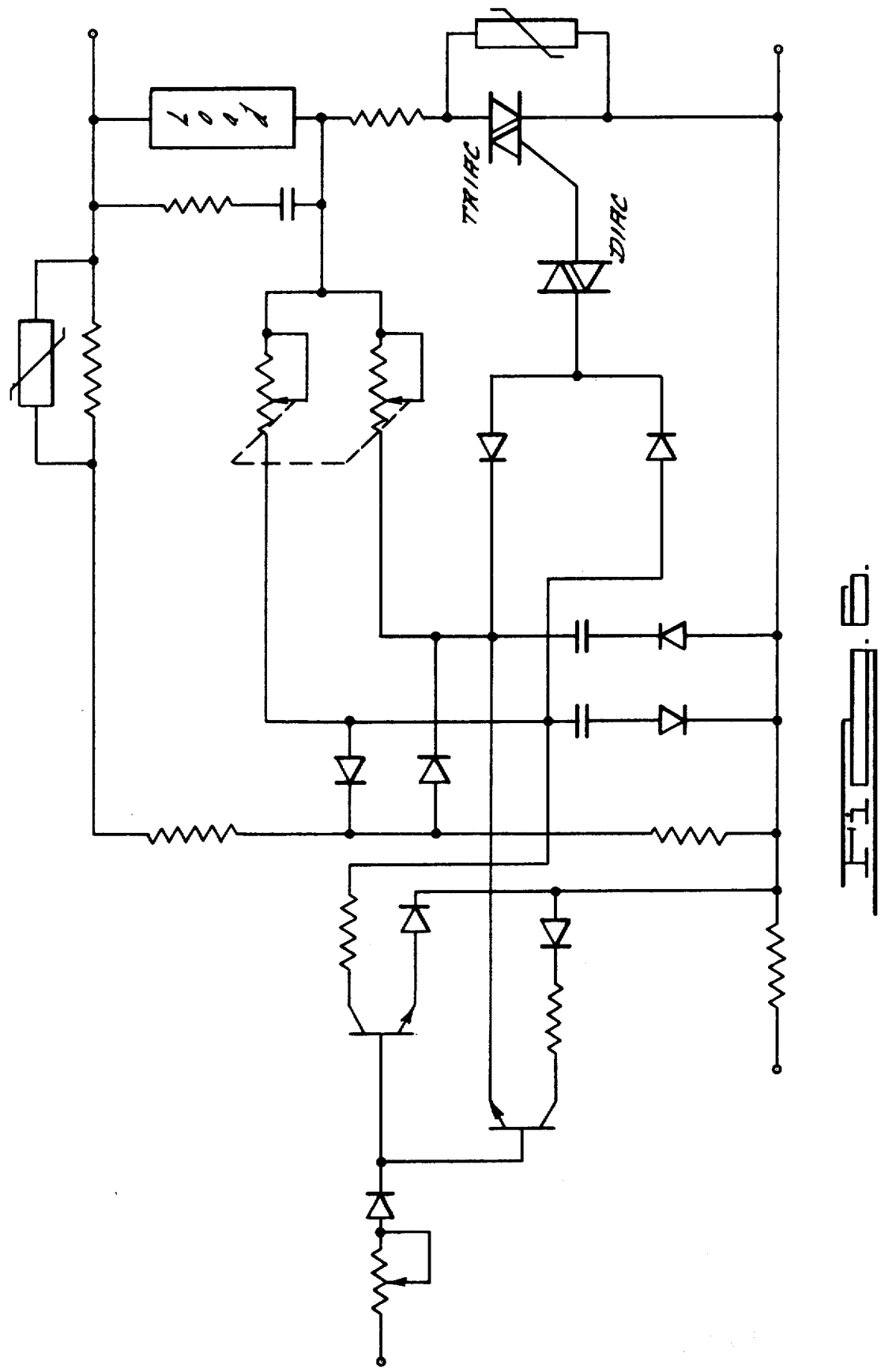

ELECTRICAL CIRCUIT FOR CONTROLLING THE FEED RATE OF PARTS

BACKGROUND AND SUMMARY OF THE INVENTION

The present invention relates to a control circuit for automatically controlling the feed rate of parts.

Prior art control circuits have been devised for automatically controlling the speed of conveyors or other motion systems in accordance with the frequency of parts passing a given point. Invariably, however, these prior art systems are accompanied by the caveat that they are unsuitable for controlling inductive loads. This is primarily due to the fact that a conventional control system will cause an inductive motor to overheat after a short period of operation. The overheating problem arises when controlling inductive loads due to the continuous cycling of the motor that is inherent with automatic motor speed control. While many conventional motors can withstand such operation for a longer period of time without seriously overheating, inductive motors will overheat, in some instances, in a matter of a few minutes. Even many conventional motors cannot be continuously operated under the control of prior art control systems over extended periods of time without encountering overheating problems.

Accordingly, it is desirable to devise a system for automatically controlling the feed rate of parts that can be used not only with motion systems driven by conventional motors, but also with systems employing inductive loads. Thus, it is the primary objective of the present invention to provide a control system that not only eliminates the overheating problem with the motive means of the system, but actually causes the motive means to operate cooler than it would operate under normal conditions.

In addition, with conventional prior art control systems, the speed of the motor often becomes erratic and the torque of the motor is substantially diminished when operated at no load or at low-speed control settings. Accordingly, there exists with conventional speed control systems certain speed control settings below which a motor will not effectively operate. Thus, for those applications wherein it is desirable to operate at relative slow speeds without a significant loss in torque, conventional speed control systems are not practical.

Accordingly, it is an additional objective of the present invention to provide a motor control system that permits the motor to be operated at low speed control settings without causing erratic operation of the motor and a corresponding loss in torque.

Another drawback of conventional speed control systems is the lack of means for controlling the spacing between parts in addition to controlling the overall feed rate of the parts. The additional control capability can be of significant importance in certain testing applications, for example, wherein it is desirable to maximize the quantity of parts being tested and at the same time maintain the accuracy of the testing procedure by insuring that adjacent parts do not pass the testing apparatus so closely as to cause erroneous test results. The present invention avoids this problem by providing circuitry that controls the reaction time of the load to the passage of parts by the sensing device. In this manner, the gap between parts can be accurately controlled to the extent that the motor can actually be made to rapidly slow down and then rapidly speed up following the detection by the sensing device of each individual part.

Generally speaking, the present invention comprises a light source and a photo-sensing device disposed on either side of a passageway so that parts moving along the passageway will interrupt the light beam between the light source and the photo sensing device. The photo-sensor is adapted to provide an output pulse whenever the light beam from the light source is interrupted. The output pulses from the photo-sensor are provided to a monostable multivibrator which converts the signal to a sequence of fixed amplitude fixed width pulses. The sequences of pulses from the multivibrator are then integrated and provided to the base of a transistor which controls the level of charge on a storage capacitor.

The storage capacitor is charged by a supply voltage until a level of charge is attained that exceeds the breakover potential of a threshold device. When this occurs, an electronic switching device is fired which, in turn, controls the operation of the motor.

Accordingly, it will become apparent that the greater the number of parts passing the sensing device, the lower the average level of charge on the storage capacitor, and the slower the average speed of the motor. Similarly, the fewer the number of parts passing the sensing device, the greater the average charge level on the capacitor, and the faster the average speed of the motor.

Also included, is a high wattage, low valued resistor which, is connected in series with the motor to absorb the heating spikes which result from the cyclic operation of the motor inherent with proportional control. In addition, a separate discharge path is provided from the capacitor to ground through a normally back-biased diode, to rapidly return the charge level on the capacitor to its quiescent state after each cycle of the supply voltage. In this manner, the problem commonly referred to as "skip-cycling" is avoided, which permits the motor to be operated at slow speed control settings without erratic motor operation or significant loss in torque.

BRIEF DESCRIPTION OF THE DRAWINGS

Other objects and advantages of the present invention will become apparent from a reading of the following detailed description of the preferred embodiments which make reference to the following set of drawings in which:

FIG. 6 is a circuit diagram of an alternative embodiment of the control circuit of the present invention illustrated in FIG. 3.

DETAILED DESCRIPTION OF THE PREFERRED EMBODIMENTS

Figure 1:
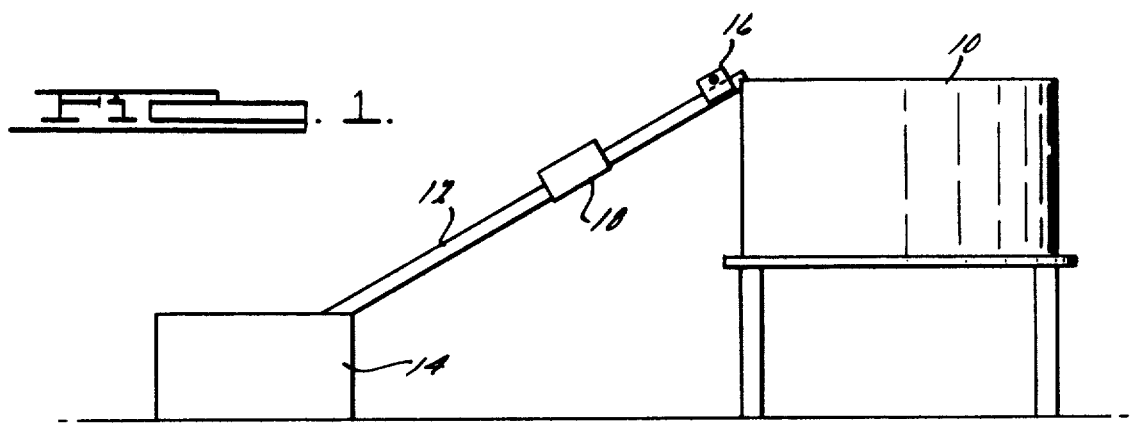
FIG. 1 is a plan view illustrating a typical application of the present invention.

Referring to FIG. 1, an exemplary application of the control system according to the present invention is shown. The system illustrated in FIG. 1 includes a vibratory feeder 10, such as that manufactured by Syntron Corporation, having leading therefrom a chute 12 which feeds a hopper 14. Located at a random point along the chute 12 is a testing unit 18 that is adapted to test the parts passing along the chute 12 for various characteristics such as composition or hardness differential.

Figure 2:
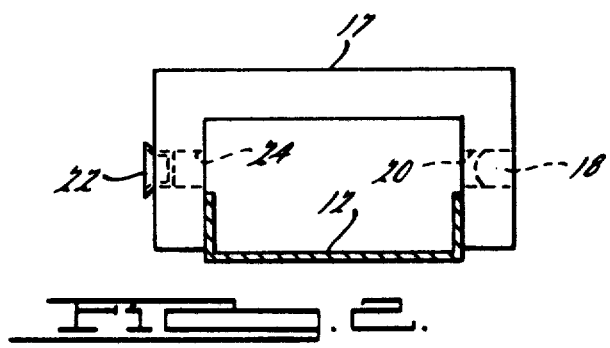
FIG. 2 is a perspective view of the sensor unit.

Disposed at the entry point of the chute 12 is a sensing unit 16 that houses the photo-sensor 22. As is best shown in FIG. 2, the sensing unit 16 comprises an inverted U-shaped mounting bracket 17 that is adapted to fit over the chute 12. A pair of alligned holes 20 and 24 are formed in opposite sides of the mounting bracket 17 for receiving the light source 18 and the photo-sensor 22. The light source 18 is preferably recessed in hole 20 so that the light emitted therefrom will be directed toward the photo-transistor 22. Similarly, the photo-sensor 22 is also recessed in hole 24 so that it will be substantially unaffected by changes in ambient light.

The sensing unit 16 is adapted to be positioned over the chute 12 so that each part that enters the chute 12 from the vibratory feeder 10 will interrupt the light beam between the light source 18 and the photo-sensor 22. As will subsequently be explained in greater detail, this causes a change in the resistance of the photo-sensor 22 which appears as a signal pulse to the control circuit.

Returning to FIG.1, the present control system is adapted to control the speed of the vibratory feeder 10 so that the rate of parts passing through the testing unit 18 is maximized. In particular, it is desirable to maintain the speed of the vibratory feeder 10 as fast as possible without creating a jam in the parts, or causing more than one part to pass through the testing unit 18 at one time. Typically, however, the speed at which the vibratory feeder 10 must be set to insure the accuracy of the test readings requires an unacceptably slow feed rate. This is primarily due to the fact that the vibratory feeder 10 cannot provide a uniform feed rate of parts. Thus, when left unattended, gaps arise in the supply of parts resulting in significant periods when no parts are passing through the testing unit 18. Accordingly, to optomize the number of parts that can be tested during a given period of time, it becomes necessary to continuously adjust the speed of the vibratory feeder 10 in accordance with the rate at which parts pass the testing unit 18.

Figure 3:
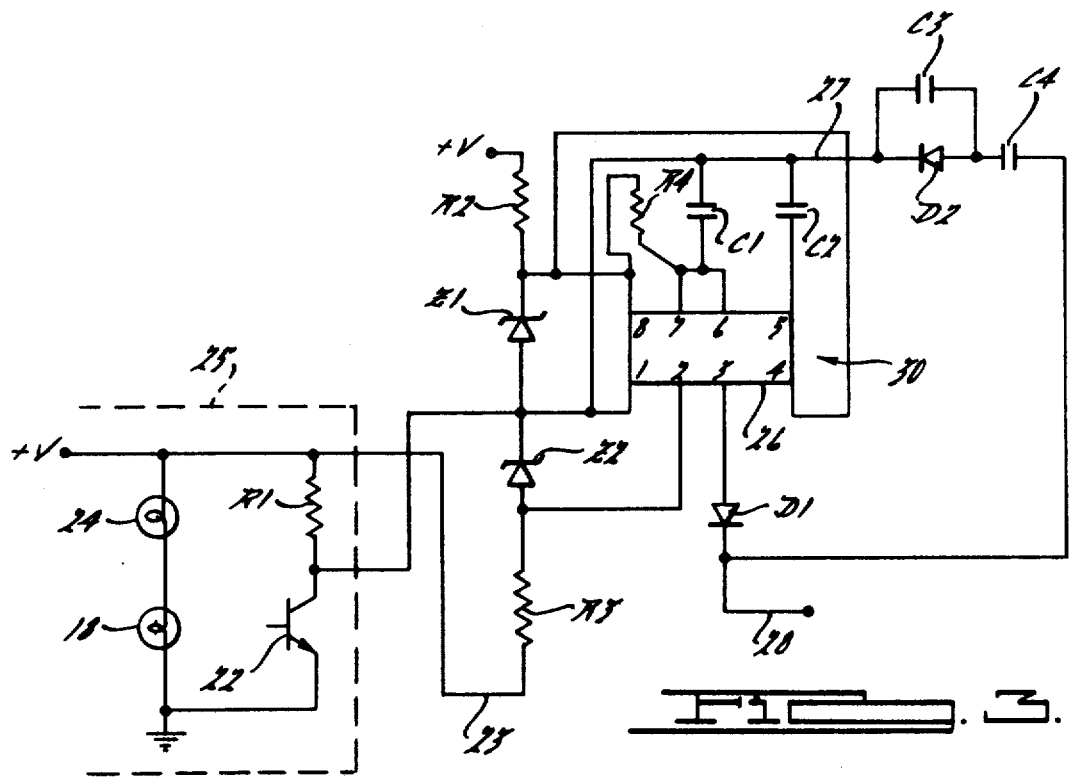
FIG.3 is a circuit diagram of a part of the control system of the present invention.
Figure 4:
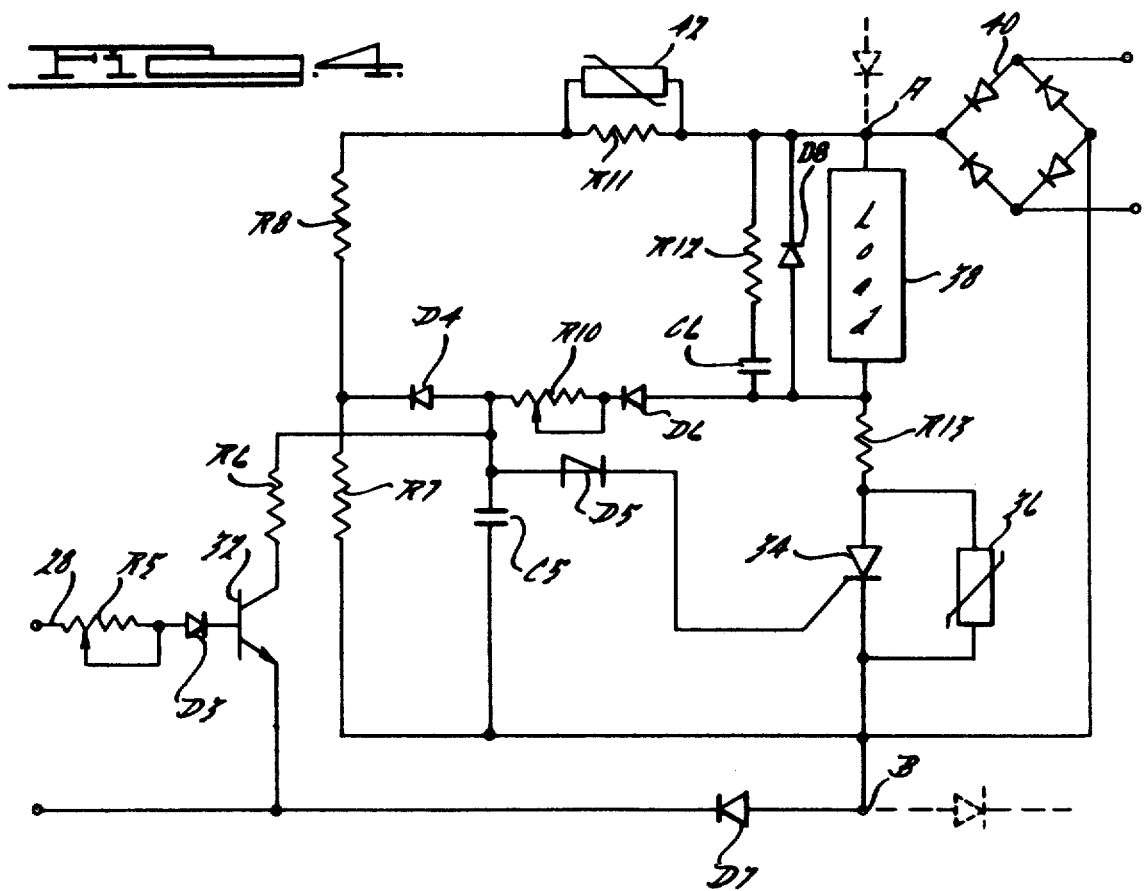
FIG. 4 is a circuit diagram of another part of the control circuit of the present invention.

Referring now to FIGS. 3 and 4, a circuit diagram of the preferred embodiment of the control circuit according to the present invention is shown. The detector circuit 25 illustrated in FIG. 3 comprises a light source 18 connected between a positive supply potential and ground. Additionally connected in series with the light source 18 is a pilot light 24 which provides a visual indication whenever the control circuit is operating. The sensing device utilized in the preferred embodiment comprises a phototransistor 22. However, any suitable photosensing device may be used. Phototransistor 22 has its collector terminal connected to the positive supply voltage through a resistor R1 and its emitter terminal connected to ground. The base terminal of the phototransistor 22 is left disconnected. As is common knowledge to those skilled in the electronics art, phototransistor 22 acts as a variable resistor whose resistance is dependent upon the amount of ambient light striking the transistor. In the preferred embodiment, the signal across resistor R1 is equal to four volts when phototransistor 22 is exposed to light from the light source 18, and zero volts when the light beam between light source 18 and phototransistor 22 is blocked. Thus, it can be seen that the output signal on line 23 comprises a constant four volt signal with negative-going pulses interspersed corresponding to the passage of parts past phototransistor 22.

The output signal from detector circuit 25 is provided to the input of a monostable multivibrator 30, which is comprised essentially of an integrated circuit 26. I.C. 26 is standard "chip" that is commercially available from a wide variety of manufacturers. The particular chip utilized in the preferred embodiment is manufactured by Sibernetics Corporation under the part designation number RS555. This I.C. was selected for its stability and the fact that it is frequency independent of voltage changes in the power supply. The detector output signal on line 23 is provided to pin 2 of the integrated circuit 26 through a resistor R3. Pin 2 of I.C. 26 is additionally connected to ground through a zener diode Z2. Pin 1 of I.C. 26 is also connected to round potential and pin 8 is connected through a resistor R2 to a regulated positive supply voltage. Pin 7 is connected through a resistor R4 to pin 8 and through a capacitor C1 to ground. Pin 6 is likewise connected to the positive side of capacitor C1. Pin 5 is connected through a capacitor C2 to ground and pin 4 is connected to the regulated positive supply voltage through resistor R2. An additional zener diode Z1 is connected between resistor R2 and ground. Finally, pin 3 of I.C. 26 is connected through a diode D1 to the output line 28.

The output from multivibrator 30, as it appears on line 27, comprises a sequence of fixed width, fixed amplitude square wave pulses correlative of the sequence of negative-going pulses received from the output of detector circuit 25. The width of the square wave pulses provided at the output of multivibrator 30 are dependent upon the time constant determined by the values of resistor R4 and capacitor C1, and consequently can be narrowed or widened to accommodate a particular application simply by altering the values of these components.

Figure 5:
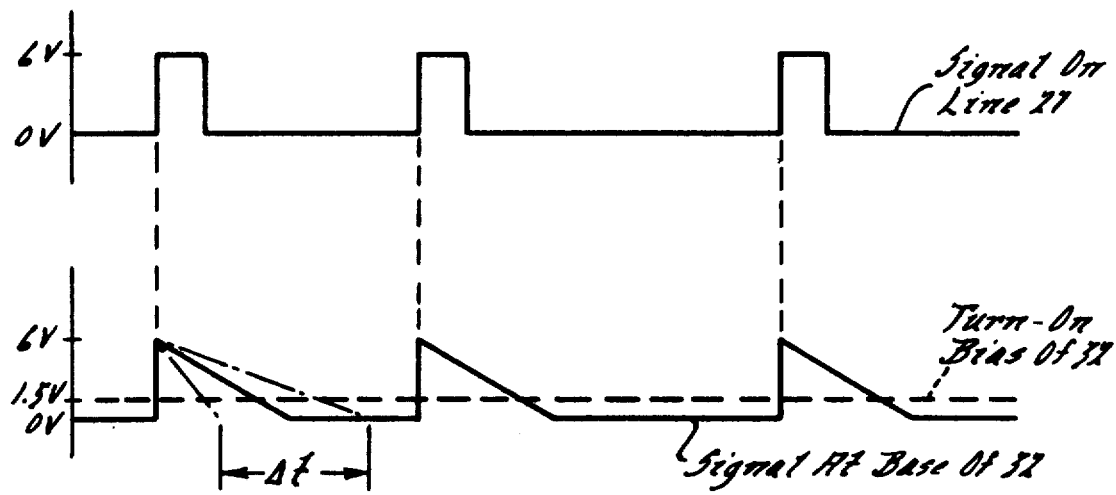
FIG. 5 is a signal diagram illustrating the operation of a part of the control circuit.

The square wave output signal from multivibrator 30 is provided to output line 28 through a diode D2 and a capacitor C4. Additionally connected in parallel with diode D2 is another capacitor C3. The signal on output line 28 is provided to the base of a transistor 32, as illustrated in FIG. 4, through a potentiometer R5 and a diode D3. The circuitry between the output from multivibrator 30 and the base of transistor 32, and in particular capacitor C4 and potentiometer R5, effectively integrates the square wave output pulses from multivibrator 30 so that the signal applied to the base of transistor 32 appears as a sequence of triangular shaped pulses as illustrated in FIG. 5. By adjusting the value of potentiometer R5, the negative-going slope of the pulses can be varied.

The significance of integrating the square wave signal from multivibrator 30 before applying the signal to the base of transistor 32 is as follows. The magnitude of the output signal from multivibrator 30 varies between 0 and 6 volts, and the full turn-on bias potential of transistor 32 is approximately 1.5 volts. Thus, if the square wave signal were not integrated, transistor 32 would be rendered conductive for a fixed period of time for each pulse applied to its base. However, by integrating the square wave signal and providing means for adjusting the slope of the negative-going portion of the resulting triangular-shaped signal, the period of time during which transistor 32 is conducting for each pulse received can be substantially altered. This is graphically illustrated in FIG. 5 by the notation 66 t, indicating the time differential between two pulses having different settings for potentiometer R5. As will subsequently be more fully appreciated from the description of the remainder of the control circuit, the effect of this arrangement is to provide the system with the capability of controlling the spacing between individual parts as they pass the sensor unit 16.

Returning to FIG. 4, transistor 32 is connected across capacitor C5 to control the charge on the capacitor. In particular, the collector of transistor 32 is connected to one side of capacitor C5 through a resistor R6 and its emitter is tied to ground. The opposite side of capacitor C5 is also connected to ground.

Capacitor C5 is positively charged by the supply voltage through the load (i.e., motor) 38, a diode D6 and a potentiometer R10. The charge time of the capacitor C5 is determined by the total resistance in the charge path, and as such is controllable by adjusting potentiometer R10. As will subsequently become more apparent, by adjusting the charge time of capacitor C5, the average speed of the motor 38 can be varied.

The charge level on capacitor C5 controls the triggering of an SCR 34 which has its control terminal connected to the positive side of capacitor C5 through a Shockley diode D5. The SCR 34 used in the preferred embodiment is adapted to fire when the charge level on capacitor C5 reaches approximately 10 volts. The cathode terminal of SCR 34 is connected through a resistor R13 to the motor 38, and the anode of SCR 34 is connected to ground. Thus, when the SCR 34 is conducting, the current path from the power source through the motor 38 to ground is completed. Similarly, when the charge on capacitor C5 is below that required to fire SCR 34, the SCR 34 is rendered non-conductive and the motor 38 is turned off. It should be noted that the present circuit can be readily modified so that when SCR 34 is conducting the motor 38 is off, and when SCR 34 is not conducting the motor 38 is operating.

Additionally connected in parallel with SCR 34 is a metal oxide varistor 36 which is included to provide transient protection for the output of the circuit. Varistor 36 essentially acts as a back-to-back zener diode, however, it is capable of handling much larger transient spikes. A similar varistor 42 is included in the input line from the power source across resistor R11 to provide similar transient protection for the input of the circuit. In addition a "snubber" network, comprised of capacitor C6, resistor R12 and diode D8, is connected in parallel with the motor 38 to provide load protection for the motor. Diode D7 is provided to prevent any negative signals from being fed back to the multivibrator section of the circuit.

The control circuit illustrated in FIG. 4 is shown connected to a conventional 120 volt AC line through a full wave bridge rectifier 40. However, the circuit can just as readily be operated under half-wave DC simply by eliminating the bridge rectifier 40 and connecting one side of the AC power source through a diode to point "A" and the other side of the AC source through a reverse diode to point "B", as indicated by the dotted lines in FIG. 4.

In addition, the control circuit is readily adaptable to AC operation by essentially duplicating the control portion of the circuit to accommodate the negative half of the AC signal and substituting a DIAC and a TRIAC for the Shockley diode and SCR, respectively, as illustrated in FIG. 6. The theory of operation of the circuit remains the same and therefore will not be discussed in detail.

In operation, assuming that no parts are passing photosensor 22, capacitor C5 will charge through the load 38 and potentiometer R10 to the potential of the full wave DC signal provided from bridge network 40. The charge on capacitor C5 will, of course, lag the DC signal by a time delay factor equivalent to the time constant associated with the capacitor C5 and the resistance of the charge path. When the charge on the capacitor C5 exceeds the breakover voltage of the Shockley diode D5, the SCR 34 is fired. In the preferred embodiment, the breakover voltage of the Shockley diode is selected to be slightly greater than the turn-on voltage of SCR 34 so that sharp switching action of the SCR 34 will occur. In addition, the slightly greater breakover voltage of the Shockley diode D5 permits the capacitor C5 to charge properly through the partial turn-on range of the SCR 34 until the full turn-on voltage level of the SCR is attained. When the SCR 34 is fired, the circuit from the power source through the motor 38 to ground is completed. Accordingly, the motor 38 begins to operate until the charge on the capacitor C5 drops below the breakover voltage of the Shockley diode D5 and turns off the SCR 34. Thus, with a full-wave rectified signal varying between zero and approximately 190 volts, and transistor 32 not conducting, the SCR 34 is fired every half cycle of the waveform at the phase angle determined by the setting of potentiometer R10.

To insure that SCR 34 fires at the same phase angle of each half cycle of the waveform for a given setting of potentiometer R10, it is necessary to insure that capacitor C5 does not retain residual charge from previous cycles of the waveform. Particularly at no load and low speed control settings, the retention of charge by capacitor C5 can cause SCR 34 to "lock on", creating motor runaway, or alternatively, cause the SCR 34 to miss firing for certain cycles of the waveform, creating erratic motor operation and a corresponding loss in torque.

The phenomenon of "skip-cycling" is caused because at slow speed control settings, no significant counter emf is induced in the armature of the motor 38. Thus, the SCR 34 tends to fire at low bias settings. The motor 38 then accelerates to a point at which counter emf is enduced in the rotating armature that exceeds the gate-firing bias of the SCR 34, thereby preventing SCR 34 from firing. Accordingly, SCR 34 is unable to fire again until the speed of the motor 38 is reduced to a value for which the enduced voltage in the rotating armature is less than the gate bias. At this time, SCR 34 fires again. Thus, motor deceleration occurs over a number of cycles, hence, the term "skip-cycling".

The present invention prevents skip-cycling by providing additional circuitry which insures that SCR 34 will fire at the proper phase angle of each cycle of the voltage source waveform. This is accomplished by utilizing a separate discharge path comprising diode D4 and resistor R7 connected between capacitor C5 and ground. Resistor R7 is preferably selected to be substantially smaller than the value of potentiometer R10, so that the discharge rate through resistor R7 is substantially faster than the charge rate of the capacitor C5 through potentiometer R10. However, to permit charge to accumulate on capacitor C5 rather than draining to ground through resistor R7, it is necessary to back-bias diode D4 by connecting its anode through a resistor R8 (and resistor R11) to the positive side of the power supply. Since the charge path through motor 38 and potentiometer R10 presents greater resistance than resistors R8 and R11, the potential at the anode side of diode D4 will be greater than the potential at the cathode side of diode D4. As long as this potential difference exists, diode D4 will block current flow, thus permitting a charge to accumulate on capacitor C5. However, when the magnitude of the waveform from the power source drops below the charge level on capacitor C5, (which is approximately equal to 10 volts, the breakover voltage of the Shockley diode D5), diode D4 will not longer be back-biased and the charge on capacitor C5 will drain through diode D4 and resistor R7 to ground. Thus, capacitor C5 is discharged to a charge level of approximately 0.9 volts, the minimum potential which diode D4 will pass.

Accordingly, it can be seen that after each half cycle of the full-wave DC waveform, the charge on capacitor C5 is "reset" to its quiescent charge level of 0.9 volts. In this manner, a charge from previous cycles is prevented from accumulating on capacitor C5 which could cause SCR 34 to miss firing or enter into a "runaway" (i.e., constant on) condition, even at no load and low speed control settings.

Whenever a part is detected by the detector circuit 25 and a corresponding pulse is provided by monostable multivibrator 30, transistor 32 is biased to its "on" position, thereby providing a direct current discharge path from capacitor C5 to ground. Since the value of resistor R6 is relatively small, the discharge time through transistor 32 when the transistor is conducting is extremely fast. Accordingly, any charge that has built up on capacitor C5 is rapidly dissipated whenever transistor 32 is conducting. With the charge drained from capacitor C5, the turn-on bias of the SCR 34 is removed and the motor 38 is turned off. When the triangular-shaped pulse provided to the base of transistor 32 falls below the turn-on bias of transistor 32 (approximately 1.5 volts) the transistor is again rendered non-conductive, and the capacitor C5 is once again permitted to charge. As before, when the charge on the capacitor C5 again exceeds the breakover voltage of the Shockley diode D5, SCR 34 is fired and the motor 38 is turned on.

Thus, it can be seen that the greater the frequency of parts passing the sensor unit 16, the more frequent the periods during which SCR 34 is not conducting and hence, the slower the average speed of the motor 38. Conversely, as the frequency of parts passing the sensor unit 16 diminishes, the greater the percentage of time SCR 34 is conducting and the faster the average speed of the motor 38.

In addition, it will be appreciated that by adjusting the setting of resistor R5, the period of time for which SCR 34 is rendered non-conductive following the detection of each part can be varied. Consequently, the spacing between parts is controllable by varying the slow-down period of the motor 38. In other words, if it is desired that the parts follow one another in rapid succession, potentiometer R5 is set to a low value providing a rapid decline in the magnitude of the triangular-shaped pulse provided to the base of transistor 32. Accordingly, transistor 32 is rendered conductive for only a brief period of time, after which a charge again builds on capacitor C5 firing SCR 34. Thus, the motor 38 is only briefly shut down creating a short delay in the stream of parts. On the other hand, if potentiometer R5 is set to a large value, the period of time during which transistor 32 is rendered conductive following the detection of a part is increased. Accordingly, the charge on capacitor C5 is dissipated and SCR 34 is rendered non-conductive for an equivalent period, causing a substantial slow-down in the speed of the motor 38. Thus, a longer delay between the passage of parts is introduced.

Consequently, as will be appreciated by those skilled in the art, by optimizing the settings of both potentiometers R5 and R10, the maximum feed rate for a particular application can substantially be attained. In the exemplary testing application outlined above in connection with the description of FIG. 1, a typical rate of 5000 parts/hour can be increased to over 7000 parts/hour utilizing the automatic control circuit of the present invention.

Finally, it is to be noted that the present invention is particularly adapted to be used for controlling inductive motors without giving rise to the overheating problems common with conventional prior art systems. This capability is primarily attributable to the high-wattage, low value resistor R13 connected in series between the motor 38 and the SCR 34 for absorbing the substantial heating spikes which occur when an inductive motor is cyclically operated. The high wattage wire-wound resistor R13, commonly referred to as a "surgistor", effectively acts as an inductance to dissipate the heating spikes that occur during startup and stopping of the motor 38 by preventing the heating spikes from being fed back to the motor 38. The result is that when operated under the control of the present system, an inductive motor will actually operate cooler for a longer period of time than when operated independently of any automatic control system. Thus, it can be appreciated that the present invention is ideally suited for controlling inductive motors such as vibratory feeders, heretofore incapable of being controlled by conventional automatic control systems.

While the above description constitutes the preferred embodiment of the invention, it will be appreciated that the invention is susceptible to modification, variation and change without departing from the proper scope or fair meaning of the accompanying claims.

What is claimed is:

1. In an electronic circuit for automatically controlling the feed rate of parts including:
   motive means for causing movement of said parts along a passageway; and
   detector means for detecting the passage of parts past a given point and producing a detector signal in response thereto; the improvement comprising
   circuit means connected to said detector means for producing a rate signal related to said detector signal, including capacitance means adapted to be charged by a voltage source of varying magnitude and first switching means for controlling the charge on said capacitance means in accordance with said detector signal;
   control means connected to said circuit means for controlling the operation of said motive means in accordance with said rate signal, including second switching means connected in circuit with said motive means for changing the operative state of said motive means whenever the charge on said capacitance means exceeds a predetermined level; and reset means connected to said capacitance means for rapidly discharging said capacitance means whenever the magnitude of the signal from said voltage source decreases below said predetermined level.

2. The circuit of claim 1 wherein said motive means comprises an inductive motor, and said control means further includes means for preventing said inductive motor from overheating when operated under the control of said electronic circuit by substantially dissipating the heating spikes generated by said inductive motor.

3. The circuit of claim 2 wherein said means comprises a high wattage, low resistance resistor connected in circuit with said inductive motor.

4. The circuit of claim 1 wherein said control means further includes threshold means connected in circuit between said capacitance means and said second switching means for preventing said second switching means from changing the operative state of said motive means until the charge on said capacitance means exceeds said predetermined level.

5. The circuit of claim 4 wherein said second switching means comprises a silicone controlled rectifier having a turn-on bias voltage less than said predetermined level.

6. The circuit of claim 5 wherein threshold means comprises a Shockley diode having a breakover voltage equivalent to said predetermined level.

7. The circuit of claim 1 wherein said reset means comprises a low resistance discharge circuit connected between said capacitance means and ground potential, including a diode that is back-biased whenever the magnitude of the signal from said voltage source is greater than said predetermined level.

8. The electronic circuit of claim 1 wherein said circuit means further includes delay means for controlling the spacing between the parts passing said given point by controlling the duration of the slow-down period of said motive means following the detection by said detector means of a part.

9. The electronic circuit of claim 8 wherein said detector means is adapted to provide an output pulse whenever a part passes said given point, and said delay means is adapted to control the decay time of each of said output pulses.

10. The electronic circuit of claim 9 wherein said first switching means is adapted to discharge said capacitance means below said predetermined level whenever the amplitude of said output pulses is greater than a second predetermined bias level.

11. The electronic circuit of claim 10 wherein said first switching means comprises a transistor connected across said capacitance means having its control terminal connected to receive said output pulses, and said delay means comprises a capacitance/resistance timing network for controlling the decaying slope of each of said output pulses so as to control the period of time during which the amplitude of each of said output pulses exceeds said second predetermined bias level.

12. In an electronic circuit for automatically controlling the feed rate of parts including:
motive means for causing movement of said parts along a passageway;
detector means for detecting the passage of parts past a given point and producing a detector signal in response thereto;
circuit means connected to detector means for producing a rate signal related to said detector signal, including capacitance means adapted to be charged by a voltage source of varying magnitude and first electronic switching means for controlling the charge on said capacitance means in accordance with the amplitude of said detector signal; and
control means connected to said circuit means for controlling the operation of said motive means in accordance with said rate signal, including second electronic switching means connected in circuit with said motive means for changing the operative state of said motive means whenever the charge on said capacitance means exceeds a predetermined level; the improvement comprising
delay means connected between said detector means and said circuit means for controlling the spacing between the parts passing said given point by controlling the amplitude of said detector signal.

13. The electronic circuit of claim 12 wherein said detector means is adapted to provide an output pulse whenever a part passes said given point, and said delay means is adapted to control the decay time of each of said output pulses.

14. The electronic circuit of claim 13 wherein said first electronic switching means is adapted to discharge said capacitance means below said predetermined level whenever the amplitude of said output pulses is greater than a second predetermined bias level.

15. The electronic circuit of claim 14 wherein said first electronic switching means comprises a transistor connected across said capacitance means having its control terminal connected to receive said output pulses, and said delay means comprises a capacitance/resistance timing network for controlling the decaying slope of each of said output pulses so as to control the period of time during which the amplitude of each of said output pulses exceeds said second predetermined bias level.

* * * * *

UNITED STATES PATENT AND TRADEMARK OFFICE
CERTIFICATE OF CORRECTION

PATENT NO. : 4,096,424
DATED : June 20, 1978
INVENTOR(S) : George J. Hysler

It is certified that error appears in the above—identified patent and that said Letters Patent are hereby corrected as shown below:

Column 4, line 19, "round" should be --ground--; Column 5, line 2, "66t" should be --at--; Column 7, line 14, "not" should be --no--; Column 10, line 14, after "connected to" insert --said--.

Signed and Sealed this

Fourteenth Day of November 1978

[SEAL]

Attest:

RUTH C. MASON
Attesting Officer

DONALD W. BANNER
Commissioner of Patents and Trademarks